United States Patent
Gibson et al.

(10) Patent No.: US 9,440,400 B2
(45) Date of Patent: Sep. 13, 2016

(54) PLURAL-COMPONENT, COMPOSITE-MATERIAL HIGHWAY DOWEL BAR FABRICATION METHODOLOGY

(71) Applicant: Composite Rebar Technologies, Inc., Salem, OR (US)

(72) Inventors: Robert C. Gibson, Madison, WI (US); Matthew H. Noble, Lebanon, OR (US); Trent J. Garber, Albany, OR (US)

(73) Assignee: Composite Rebar Technologies, Inc., Salem, OR (US)

( * ) Notice: Subject to any disclaimer, the term of this patent is extended or adjusted under 35 U.S.C. 154(b) by 225 days.

(21) Appl. No.: 14/033,461

(22) Filed: Sep. 21, 2013

(65) Prior Publication Data

US 2014/0021647 A1     Jan. 23, 2014

Related U.S. Application Data

(62) Division of application No. 13/756,507, filed on Jan. 31, 2013, now Pat. No. 8,591,139.

(60) Provisional application No. 61/595,042, filed on Feb. 4, 2012.

(51) Int. Cl.
| | | |
|---|---|---|
| *B29C 70/02* | (2006.01) | |
| *E01C 11/14* | (2006.01) | |

(Continued)

(52) U.S. Cl.
CPC ............ *B29C 70/021* (2013.01); *B29C 70/52* (2013.01); *B29C 70/521* (2013.01); *B29C 70/865* (2013.01); *E01C 11/14* (2013.01)

(58) Field of Classification Search
CPC ... B29C 70/021; B29C 70/52; B29C 70/521; B29C 70/523

USPC .......................................................... 264/149
See application file for complete search history.

(56) References Cited

U.S. PATENT DOCUMENTS

3,283,050 A     11/1966   Boggs
4,265,981 A     5/1981    Campbell
(Continued)

FOREIGN PATENT DOCUMENTS

| AU | 729030 B2 | 1/2001 |
| CN | 2832896 Y | 11/2006 |
| DE | 2500375   | 8/1976 |

OTHER PUBLICATIONS

U.S. Receiving Office of WIPO, International Search Report of the International Searching Authority regarding PCT Application No. PCT/US2013/024239, dated Apr. 8, 2013, 2 pages.

(Continued)

*Primary Examiner* — Timothy Kennedy
(74) *Attorney, Agent, or Firm* — Kolisch Hartwell, P.C.

(57) ABSTRACT

A method for making a plural-component, composite-material, highway dowel-bar including (1) preparing an elongate core train possessing endo-abutting, longitudinally alternating, (a) elongate, high-shear-strength, cylindrical cores having a common cross section, and (b) elongate, but shorter, cylindrical, fiber-reinforced plastic-resin end-plug blanks having opposite ends, and each having a cross section matching the cross section of the cores, (2) using the core train as a longitudinally moving mandrel, pultrusion-forming a fiber-reinforced plastic-resin sleeve continuously and bondedly around the core train so as to produce a pultrusion-result, intermediate, dowel-bar product, and (3) following pultrusion-forming, cross-cutting the intermediate, dowel-bar product at each longitudinal location therein which is intermediate the opposite ends of the end-plug blanks, thereby to form completed dowel bars.

8 Claims, 2 Drawing Sheets

(51) Int. Cl.
*B29C 70/52* (2006.01)
*B29C 70/86* (2006.01)

(56) References Cited

U.S. PATENT DOCUMENTS

| | | | |
|---|---|---|---|
| 4,296,060 | A | 10/1981 | Killmeyer et al. |
| 4,780,166 | A | 10/1988 | Hunter |
| 4,814,133 | A | 3/1989 | Matsuno et al. |
| 5,055,324 | A | 10/1991 | Stecker |
| 5,084,221 | A | 1/1992 | Matsuno et al. |
| 5,166,230 | A | 11/1992 | Stecker |
| 5,182,064 | A | 1/1993 | Ishizuka et al. |
| 5,567,374 | A | 10/1996 | Thicthener et al. |
| 5,593,536 | A | 1/1997 | Kaiser |
| 5,593,744 | A | 1/1997 | Van Vechten et al. |
| 5,609,806 | A | 3/1997 | Walsh et al. |
| 5,626,700 | A | 5/1997 | Kaiser |
| 5,650,109 | A | 7/1997 | Kaiser et al. |
| 5,702,816 | A | 12/1997 | Kaiser |
| 5,729,952 | A | 3/1998 | Dahl |
| 5,763,042 | A | 6/1998 | Kaiser et al. |
| 5,851,468 | A | 12/1998 | Kaiser |
| 5,876,553 | A | 3/1999 | Kaiser |
| 5,904,886 | A | 5/1999 | Stecker |
| 5,950,393 | A | 9/1999 | Stecker |
| 5,966,895 | A | 10/1999 | Stecker |
| 6,023,903 | A | 2/2000 | Stecker |
| 6,092,960 | A | 7/2000 | McCallion |
| 6,171,016 | B1 | 1/2001 | Pauls et al. |
| 6,197,395 | B1 | 3/2001 | Van Vechten et al. |
| 6,221,295 | B1 | 4/2001 | Kaiser et al. |
| 6,316,074 | B1 | 11/2001 | Kaiser et al. |
| 6,403,004 | B1 | 6/2002 | Stecker |
| 6,485,660 | B1 | 11/2002 | Kaiser et al. |
| 6,493,914 | B2 | 12/2002 | Kaiser et al. |
| 6,517,277 | B2 | 2/2003 | Hu et al. |
| 7,553,554 | B2 | 6/2009 | Miller et al. |
| 7,632,037 | B2 | 12/2009 | Brinkman |
| 8,206,059 | B1 | 6/2012 | Southgate et al. |
| 8,413,396 | B2 | 4/2013 | Oliva et al. |
| 2005/0123374 | A1 | 6/2005 | Thorning |
| 2005/0232697 | A1 | 10/2005 | Brinkman |
| 2008/0261042 | A1 | 10/2008 | Brandstrom |
| 2008/0318042 | A1 | 12/2008 | Kusek |
| 2010/0031607 | A1 | 2/2010 | Oliva et al. |
| 2012/0066994 | A1 | 3/2012 | Gibson et al. |
| 2013/0202355 | A1 | 8/2013 | Gibson et al. |

OTHER PUBLICATIONS

U.S. Receiving Office of WIPO, Written Opinion of the International Searching Authority regarding PCT Application No. PCT/US2013/024239, dated Apr. 8, 2013, 6 pages.
The International Bureau of WIPO, International Preliminary Report on Patentability regarding PCT Application No. PCT/US2013/024239, dated May 5, 2015, 7 pages.
Australian Intellectual Property Office, Examination Report regarding Australian Patent Application No. 2013215004, dated Jun. 16, 2015, 3 pages.
Canadian Intellectual Property Office, Examination Report regarding Canadian Patent Application No. 2861049, dated Jun. 29, 2015, 4 pages.
"FRP Fire Resistance". 1p.
"Composite Rebar Manufacturers". 1p.
"TUF-BAR TM Fibreglass Rebar", Composites Ltd., 2pp.
"Pultrall V ROD". 1p.
"The Solution for Corrosion", V ROD. 6pp.
"Fiberglass Rebar", Asian FRP Hughes Brothers. 4pp.
"Glass Fiber Reinforced Polymer (GFRP) REBAR" Aslan 100 by Hughes Brothers. 2007. 12pp.
"RockBar Corrosion resistant basalt fibre reinforcing bars", MagmaTech. 2pp.
"Fibreglass (GFRP) Rebar Infrastructure Applications", Composites Ltd. 34pp.
"FiReP GRP Bolts Bolting Systems for Mining and Tunneling". 12pp.
"FiReP(R) Product Brochure". 20pp.
"Technical Information Schock Combar(R)", Mar. 2006. 23pp.
"C-BAR Product Guide Specification", Marshall Composite Systems, LLC. 10pp.
"Specification for Carbon and Glass Fiber-Reinforced Polymer Bar Materials for Concrete Reinforcement, An ACI Standard", American Concrete Institute. 10pp.
"TBM Launch & Reception Soft Eye Openings", Aslan FRP. 12pp.
"Carbon Fiber Reinforced Polymer (CFRP)", Asian 200 by Hughes Brothers. 7 pp.
"FRPDistributors.com Home Page". 3pp.
"GFRP Rebar Specifications". 6pp.
"GFRP vs. Steel". 27pp.
"Hughes Brothers Website Notes:" 13pp.
"Fibre reinforced composite". 2pp.
"Products Features Unique to TUF-BAR TM fibreglass rebar". 8pp.
European Patent Office, Extended European Search Report regarding European Patent Application No. 137432142-1604, dated Mar. 10, 2016, 8 pages.

PLURAL-COMPONENT, COMPOSITE-MATERIAL HIGHWAY DOWEL BAR FABRICATION METHODOLOGY

CROSS REFERENCES TO RELATED APPLICATIONS

This is a divisional application from currently copending U.S. Regular patent application Ser. No. 13/756,507, filed Jan. 31, 2013, for "Plural-Component, Composite-Material Highway Dowel Bar Structure and Fabrication Methodology", which prior application claims filing-date priority to U.S. Provisional Patent Application Ser. No. 61/595,042, filed Feb. 4, 2012, for "Highway-Slab Dowel Interconnect Structure". The entire disclosure contents of these two applications are hereby incorporated herein by reference.

BACKGROUND AND SUMMARY OF THE INVENTION

This invention relates to methodology focused on making a unique, plural-component, composite-material highway (especially concrete-highway) dowel bar structure having features which successfully address, and resolve, key, serious, and interrelated, functional-reliability, componentry cost, and highway lifecycle economic problem issues that have for years been associated with highway dowel-bar technology, and relationally, with certain aspects of highway functionality longevity.

The architecture of this methodology is described herein in a manner intentionally intertwined with a companion description of the unique dowel bar which is fabricated in accordance with it.

Dowel bars are ubiquitous in concrete highway construction. They take the form of elongate, cylindrical, high-shear-strength, smooth-exterior rods, typically formed of conventional, structural steel (non-stainless), which are employed in multiple numbers, typically at 1-foot lateral-spacing intervals, as shear-bridging, slab-to-slab load-transfer components at each separation interface (joint) which exists between adjacent, travel-direction-oriented, highway slabs that are usually formed of poured concrete, and preferably, in many instances, of what is known in the art as high-performance concrete. Their most important functions are to furnish appropriate bad-transfer shear strength between adjacent slabs while at the same time (a) accommodating slab expansion and contraction (with slight, but recurrent, slab-joint openings and closings) due to ambient thermal changes, and additionally (b) minimizing the phenomenon known as slab faulting at the joints between adjacent slabs. They are conceived as simple structures, sometimes differently formed, in relation to efforts to achieve improvements over the use alone of conventional structural steel, of materials, and combinations of materials, such as epoxy-coated structural steel, zinc-coated structural steel, solely stainless steel, stainless-steel-jacketed conventional structural steel, and purely single-unit plastic composite materials—all intended to perform the above-mentioned, important "highway-performance-support" functions flawlessly for long periods of time.

However, for a number of costly and disappointing reasons outlined below, they do not do this. Intent and reality historically have not matched successfully, and the resulting hunt for necessary, important, and fundamental dowel-bar improvement, has for years been, and is still, ongoing.

It is our belief that a dowel bar which is made in accordance with the practice/methodology features of the present invention changes this situation, and that the "hunt" just mentioned may now be substantially over.

Further regarding aspects of the background, dowel-bar setting which has triggered the conception and reduction to practice of the present methodology invention, dowel bars are employed in the multi-millions in concrete highway construction, both in the United States and in numerous other countries. In such highway construction, the usual, adjacent highway-pavement slabs that lie, edge-to-edge, along a normally constructed highway lane may typically have a length of about 15-feet, and a width of about 12-feet. Between each, successive, adjacent lane slab, dowel bars, at about 1-foot lateral intervals, are included as interconnecting structures.

Because of what are currently very predictable, current-dowel-bar-materials' wear and corrosion characteristics, and due to the facts (1) that dowel bars, and the confronting, concrete faces of their associated highway slabs, are both exposable at all inter-slab, concrete highway joints, and (2) that dowel bars, during their operative lives, are subjected to substantial cyclic shear loads in the multi-millions even over relatively short periods of time—a condition which is very relevant to the durabilities and configurations of the intended, protective coatings that are furnished for various types of coated steel bars (mentioned below), they are not, and cannot comfortably be considered to be, permanent, or even satisfactorily and relatively long-lasting components of concrete highway structure in many applications. A result is the need for too-frequent dowel-bar (and associated concrete-slab) replacement—an extraordinarily costly need.

Despite many improvement-focused efforts launched in the past to minimize the necessity for, and the attendant frequencies of, highway dowel-bar replacement, these efforts have not been entirely successful. For example, and considering commonly understood corrosion and wear issues that are associated with known dowel-bar constructions, typical, widely-used, conventional steel dowel bars are obviously subjected to environmental-conditions rusting and corrosion, and do not possess characteristics which inherently help to resist these issues. Among past "improvement" attempts, purely stainless steel dowel bars, while less vulnerable, though not immune, to corrosion, nevertheless are eventually corrodible, and, very significantly, are extremely expensive as items, per se, and often prohibitively so.

Other improvement fabrication approaches taken in the past, such as coating traditional structural steel dowel bars with, for example, thin layers of epoxy or zinc, is expensive, and, for a variety of reasons, has not worked particularly well. Apart from the expense issue, and considering specifically structural matters, epoxy coatings are typically applied by spraying (or by some other suitable, surface-application technique) to long "over-lengths" of conventional, structural-steel, dowel-bar core material, with the resulting, long, core-coated product then crosscut selectively to achieve finished dowel bars of the desired lengths. The crosscut, end areas are usually then simply left uncoated, with the result that exposed steel exists at those cut ends which are thus fully exposed to all nearby, corrosive environmental conditions.

Where epoxy coating is applied completely over already pre-length-cut steel dowel-bar cores, i.e., where no post-coating cross-cutting is involved, or under those circumstances where cross-cut ends are in fact subsequently coated with epoxy, the resulting all-over epoxy coating effectively "flows" extends as a material-continuum over the sharp-edged surface discontinuities that exist, at each end of a dowel bar, between the cylindrical surface of the core steel bar material and the end surfaces of this material—a condition which thus exposes the coating material, at these sharp discontinuity regions, to very high-stress mechanical conditions, with respect to which cyclic loading of dowel bars, in their installed use conditions in concrete highway slabs, easily triggers regional stress fractures in a coating—fractures which then expose the core steel material at those vulnerable locations to corrosion-attack environmental conditions.

Another main concern involving epoxy-coated steel bars is that typical rough handling and installation of these bars damages (i.e., cracks, chips, etc.) and noticeably compromises the protective effectiveness of the employed epoxy material.

Zinc coating of conventional structural steel bar material produces dowel bars that also present a problematic issue. Zinc coating is employed as a corrosion-accepting, sacrificial layer over steel, inhibiting steel corrosion, yes, but in its sacrificial role becoming extremely roughly surface-textured, a condition interfering with the desired capability of a dowel bar to offer smooth-outside-surface sliding contact with surrounding concrete to accommodate necessary, temperature related expansion and contraction of concrete slabs.

Solid, fibre-reinforced, plastic-based, composite-material dowel bars have been proposed and tried, but, as individuals, they do not offer the shear strength of steel, and thus do not function well as comparably robust, slab-to-slab load transferors. Accordingly, where such plastic, reinforced dowel bars are selected for use, they are usually employed (a) in greater numbers, and (b) with closer lateral spacings, than are characteristic for steel dowel bars, and at least for this reason involve greater expense. Stainless-steel-jacketed, conventional steel dowel bars are quite expensive, and notwithstanding stainless jacketing, in some instances, disappointingly, also corrodible.

With these negative, expense and corrosion-driven, performance-longevity matters in mind, one of the most significant issues involving extensive dowel-bar use in concrete highway construction is that, when dowel-bar replacement becomes necessary—and frequently too often so—the materials and labor-time and -wage costs, and the related downtime associated with the need for construction-site-preparation and the subsequent pouring of new highway concrete slab material (because of the fact that, where failed dowel bars are located, the surrounding concrete highway material must be demolitioned), are extraordinary.

In this setting, there is clearly a need for an improved highway dowel bar which offers, along with impressive-performance shear strength, great resistance to corrosion decay, with both of these qualities and characteristics collaboratively contributing to (1) significant reduction of replacement need, (2) appreciable lengthening of replacement intervals where replacements are required, and in the bargain, (3), impressive minimizing of highway lifecycle, etc. costs. These considerations, while important in all concrete highway settings, are particularly important considerations where a highway is to be what is known as a high-performance highway built with high-performance/long-life concrete.

Accordingly, fabricated by practice of the methodology of the present invention is a plural-component, composite-material highway dowel bar including an elongate, high-shear-strength, cylindrical core, preferably, although not necessarily, formed of steel, and an elongate, fibre-reinforced plastic-resin jacket fully surrounding and protectively covering the entirety of the core, and exposed to no high-stress-point discontinuities, such as surface-edge discontinuities, anywhere within the overall dowel-bar structure. The jacket includes, as it results from practice of the associated invention methodology, an elongate, fiber-reinforced, cylindrically tubular, plastic-resin sleeve which circumsurrounds and is bonded to the core. The jacket sleeve, which is intentionally made longer than the inside steel core, has opposite ends that extend beyond the associated opposite ends of the received core, thus to define, together with the inwardly disposed core ends, a pair of spaced, single-open-ended, elongate, cylindrical, sleeve end wells, or simply end wells. Two, elongate, cylindrical, fiber-reinforced, plastic-resin sleeve end plugs (also referred to herein simply as plugs), each having a diameter and a cross section matching that of the steel core, fill the sleeve end wells, and are united in the overall dowel-bar structure by a bonding mechanism, such as one or more of those mentioned immediately below, which firmly secures them to the sleeve in the end wells. These plugs, together with the receiving sleeve, protectively seal the side and opposite ends of the core. The central, high-shear-strength core and the two end plugs in each dowel bar are collectively referred to as a core assembly. The outside of the sleeve is smooth. Tenacious bonding between the sleeve and the inside core assembly may include any one or more of several bonding mechanisms, including sleeve shrinkage, normal mill scale roughness of steel, associated, of course, just with the steel core, molecular inter-material forces with both the steel core and the end plugs, and other.

Thus, and very importantly, nothing about the protective jacket, and its making in accordance with the present invention, involves any condition of jacket-material "folding" around and over the sharp edge discontinuities that are present adjacent the ends of the central steel core. This important condition exists chiefly because of the fact that the sleeve in the jacket is formed, pursuant to practice of the present invention, with a length which is greater than that of the steel core, that the sleeve extends beyond each of the opposite ends of the core, and that sleeve-received and bonded end plugs having diameters and cross sections matching that of the core close the opposite ends of the sleeve to complete the core-protective jacket.

The jacket's included sleeve is fibre reinforced in plural, resin-embedded, fibre-differentiated, circumferentially-adjacent circumferential layers of fibres which take the forms of (1) elongate, linear, plural-elongate-fibre-including, glass-fibre roving material whose included fibres substantially parallel the long axis of the dowel bar, (2) continuous-glass-fibre mat material, and (3), glass-fibre veil material. The sleeve end plugs are formed preferably of roving-fibre-reinforced plastic resin, wherein the included fibres are linear and also disposed substantially parallel the long axis of the dowel bar.

The methodology of the invention proposes a pultrusion-based, dowel-bar making process including, in general terms, (a) preparing an elongate core train (preferably substantially horizontally disposed) possessing endo-abutting, longitudinally alternating (1) elongate, cylindrical, high-shear-strength cores, and (2) shorter, elongate, cylindrical and matching-cross-section resin and fiber-reinforced, pre-pultruded sleeve end-plug blanks, (b) using the core train as a longitudinally moving mandrel, pultrusion-forming a resin and fiber-reinforced sleeve continuously and bondedly around the core train so as to produce a pultrusion-result intermediate product, and (c) cross-cutting the pultrusion-result intermediate product at the longitudinal center locations of the sleeve end plugs to form the final dowel bars.

Pre-pultrusion, of the just-above-mentioned, pre-pultruded sleeve end plugs does not specifically, or necessarily, form a methodologic, procedural part of the present invention, and may be conducted in an entirely conventional manner. Such pre-pultrusion, however, is a very useful end-plug-making technique for assuring that the end plugs, in order to cooperate successfully in the dowel bar made by practice of the invention, are satisfactorily reinforced with throughout-distributed, elongate, linear fibres that substantially parallel the end plugs' long axes.

These and other features and advantages of, and offered by, the methodology of the invention will become more fully apparent as the detailed description of it which follows below is read in conjunction with the accompanying drawings.

DESCRIPTIONS OF THE DRAWINGS

FIG. 1 is a fragmentary, plan view of a high-performance concrete highway including plural, adjacent slabs that are present in one of the highway's common-direction highway lanes—these slabs being vertically-load-transferably linked/connected by plural, laterally spaced composite-material dowel bars that have been constructed in accordance with the methodology of the present invention, and that are disposed at each separation interface (joint) between these slabs.

FIG. 2 is a perspective illustration which has been prepared to be readable, along with FIGS. 3-5, inclusive, for describing two, different embodiments of (FIGS. 2-4, inclusive), and manners of making (FIG. 5), a plural-component, composite-material highway dowel bar, like those generally seen interconnecting the highway slabs in FIG. 1, made in accordance with practice of the present invention. These two embodiments, which, as determined by user choice, may be selected for different, specific applications, include two different layer-count arrangements of plastic-resin-embedded reinforcing fibres formed in a sleeve portion of the proposed dowel bar, one of which embodiments includes three fibre layers in the sleeve portion, and the other of which includes four such layers therein. Also, and as will be explained below, even other specific, sleeve-portion layer arrangements may be chosen, if desired. A portion of the illustrated bar is broken open in FIG. 2 to show certain, internal, structural features. FIG. 2 is drawn on a considerably larger scale than that employed in FIG. 1.

Figure 2:
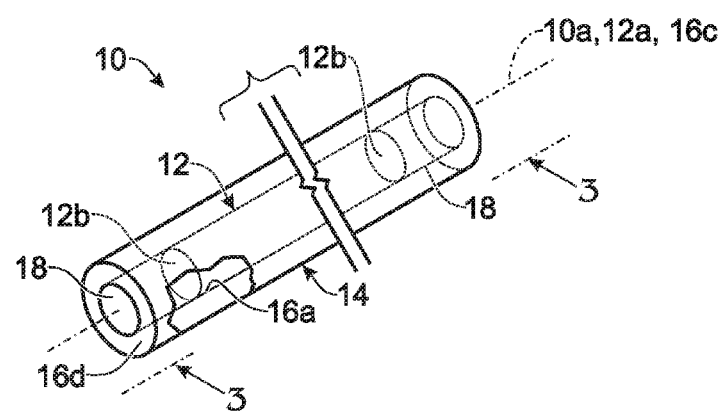
Figure 3:
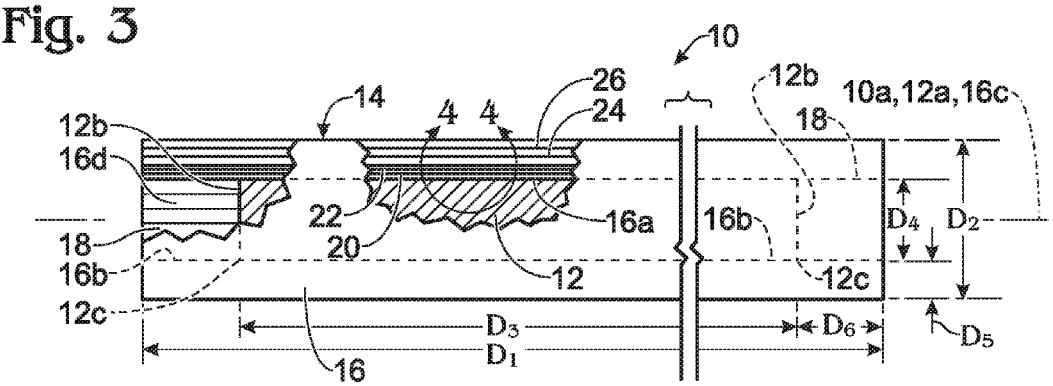
FIG. 3 is an enlarged-scale, fragmentary, side elevation, taken generally along the line 3-3 in FIG. 2, further illustrating the dowel bar of FIG. 2, and also presented with portions broken away to illustrate details of internal construction.
Figure 4:
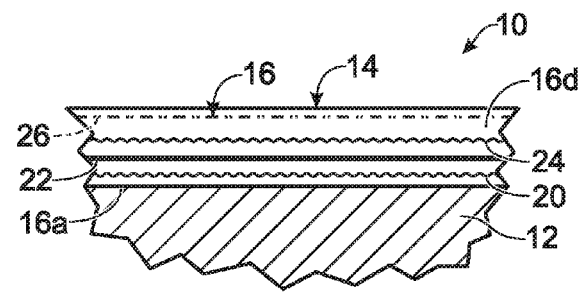
FIG. 4 is an even larger-scale, fragmentary illustration, focusing on the region in FIG. 3 which is embraced by the curved arrows shown at 4-4.
Figure 5:
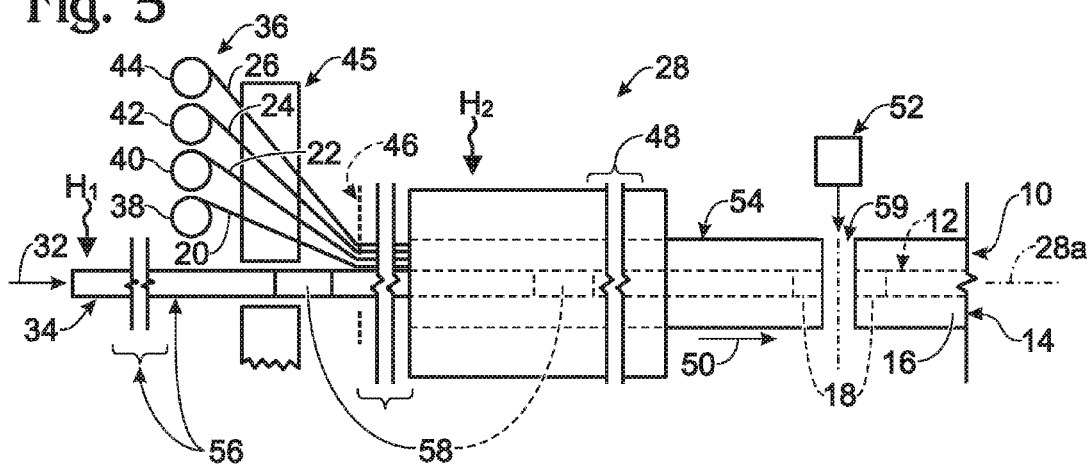

FIG. 5 pictures, on a scale which differs from than that employed in FIG. 2, a fragmentary, side elevation, schematic in nature, of apparatus for implementing the pultrusion-based methodology preferably employed in accordance with the present invention for making a plural-component, composite-material dowel bar, such as that pictured in FIGS. 2-4, inclusive.

Figure 6:
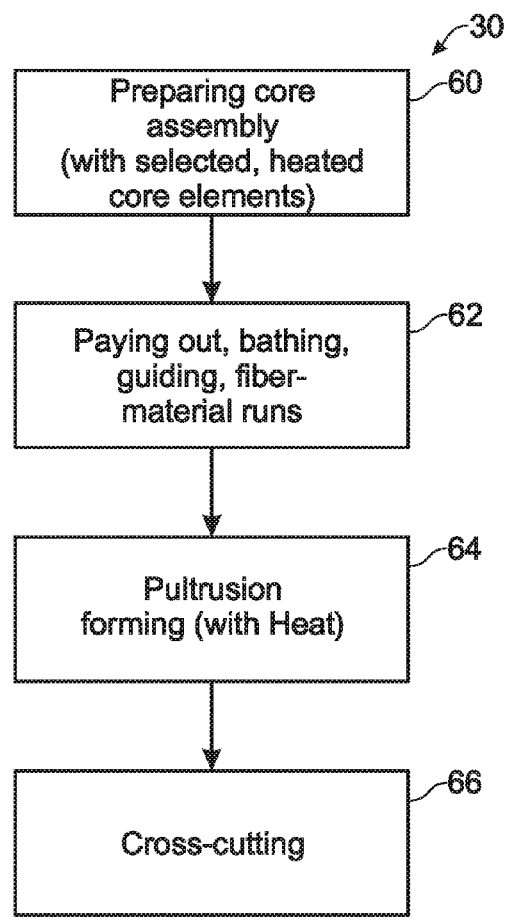

FIG. 6 is a block/schematic diagram illustrating the architecture of the preferred, pultrusion-based, dowel-bar-making methodology implemented as shown in FIG. 5.

Components, structures and positional relationships between elements presented in FIGS. 1-5, inclusive, are not drawn to scale.

DETAILED DESCRIPTION OF THE INVENTION

Figure 1:
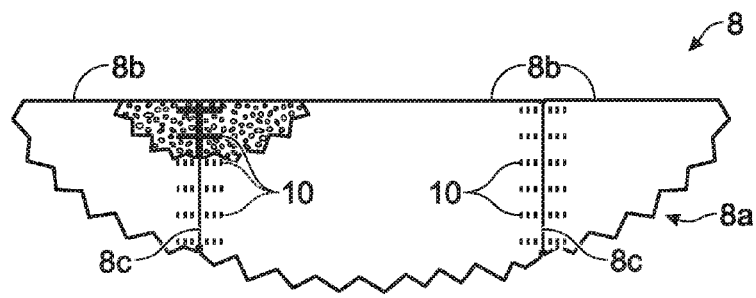

Turning now to the drawings, and referring first of all to FIGS. 1-4, inclusive, indicated generally at 8 in FIG. 1, in plan view, is a fragmentary portion of a high-performance, concrete highway, including a representative, common-travel-direction lane 8a formed with plural, adjacent concrete slabs 8b that are vertically-load-transferably interconnected, each to an adjacent slab, by plural, laterally spaced, composite-material dowel bars 10 which are disposed at about 1-foot lateral intervals at each separation interface (joint) 8c between these slabs.

Focusing especially on FIGS. 2-4, inclusive, which illustrate details of dowel-bar construction resulting from practice of the methodology of the present invention, each dowel bar 10 takes the form of an elongate, cylindrical, plural-component, composite-material structure, fabricated, at least in part (as will shortly be described) by a pultrusion process utilizing an appropriately heated pultrusion die—this process also being referred to herein as a pultrusion-based methodology in accordance with the present invention. Dowel bar 10 has a long axis shown at 10a.

The principal components present in bar 10 include (1) an elongate, cylindrical, high-shear-strength core 12, preferably, though not necessarily, made of steel, having a long axis 12a which is coincident with axis 10a, and spaced, opposite ends 12b, (2) an elongate, pultrusion-formed, fiber-reinforced plastic-resin jacket 14 having an elongate, pultrusion-formed, cylindrically tubular sleeve 16 which, within its elongate, hollow, cylindrical interior, or inside, 16a, snugly and circumsurroundingly receives core 12, and (3) a pair of pre-pultrusion-formed, cylindrical, sleeve end plugs 18 which, disposed immediately next to core 12's ends 12b, as seen, are adhesively/bondedly received complementarily within the cylindrical, opposite ends, or end wells, 16b of sleeve 16 to close off the ends of this sleeve. Sleeve 16 includes a long axis 16c which is coincident with axes 10a, 12a, and a circumferential wall 16d. Plugs 18, together with sleeve 16, form the entirety of jacket 14 which completely surrounds and sealingly protects steel core 12.

While different dimensions designed to suit different particular applications are of course entirely possible throughout the structure of the dowel bar fabricated in accordance with the present invention, dowel bar 10 herein has a fairly typical set of outer dimensions, with a length ($D_1$ in FIG. 3) of about 18-inches, and an outside diameter ($D_2$ in FIG. 3) of about 1½-inches. Within bar 10, in accordance with the embodiment now being described, core 12 has a length ($D_3$ in FIG. 3) of about 16-inches, and a diameter ($D_4$ in FIG. 3) of about 1¼-inches. Sleeve 16 has a tubular, wall thickness ($D_5$ in FIG. 3) of about ⅛-inches—this wall thickness preferably lying within a range of about 0.07- to about 0.18-inches. Sleeve end plugs 18 each has a length ($D_6$ in FIG. 3) of about 1-inches, and a circular cross section, and therefore a diameter, essentially matching those of core 12.

Conventional structural steel is employed for core 12, and a particular steel which is very suitable is known as Grade ASTM 615-60 carbon steel.

Within jacket 14, three, different, or differentiated, characters of plastic-resin-embedded, reinforcing fibers, preferably made of glass, and most preferably of e-glass, are employed. These differentiated fibre characters include (1)

glass-fibre roving, also referred to herein as elongate, linear, plural-elongate-fibre-including, glass-fibre roving material whose included fibres substantially parallel previously mentioned axes 10a, 12a, 16c, (2) glass-fibre mat, also referred to as continuous-glass-fibre mat material, and (3) glass-fibre veil, or veil material. All three of these characters of fibres are employed in sleeve 16 in what are referred to as circumferentially-adjacent, fibre-differentiated, radially spaced, circumferential (effectively cylindrically tubular) layers that are disposed circumferentially around the long axis 16c of the sleeve, within its wall 16d. Solely the roving material is employed in cylindrical end plugs 18, the fibres in which material are distributed across each plug's entire, circular cross section, with the linear fibres in such roving material substantially paralleling axes 10a, 12a and 16c.

While the reinforcing fibers employed are most preferably made of e-glass, we recognize that they might alternatively be made, for other examples, of s-glass, basalt, or carbon.

Each type of the just-mentioned, three fibre-reinforcing materials is conventional, is offered commercially in a wide variety of choices, particular sizes and other characteristics, and may freely be selected for use successfully in the making of the dowel bar being described, with such selecting being made according to specific highway applications and designer-choice considerations. Representatively, fibre-reinforcing materials which we have found to be well-suited for use in many high-performance highways include: (a), for mat material, continuous-strand glass fibre products made and offered by Owens Corning in Pennsylvania, USA; (b), for roving material, a selection drawn from the products also made by Owens Corning; and (c), for veil material, what are referred to respectively as "tissue veil" and "veil cloth" products made available by Freudenberg Nonwovens in Durham, N.C., and Xamax in Seymour, Conn.

The embedding, plastic-resin material preferably used with the reinforcing fibres in the sleeve is a conventional, urethane-modified, thermoset, vinylester resin material, such as Dion 31038-00, made by Reichhold Inc. in Durham, N.C., USA. In the end plugs, we have chosen, as a preferred plastic resin material, a conventional, thermoset polyester material, made by Razor Composites in Baraboo, Wis.

As was mentioned in relation to what is illustrated in FIGS. 2-4, inclusive, two different embodiments of a dowel bar made in accordance with the methodology of the invention, different in relation to the specific structure of sleeve 16, are effectively illustrated in these figures, with the viewer thereof appropriately considering, and then taking suitably into account, the different descriptions of these two embodiments given below herein.

Language which commonly describes both of these embodiments, in relation to the structure of sleeve 16, is that this sleeve, which is, as already mentioned, elongate and cylindrically tubular, is pultrusion formed, in accordance with practice of the present invention, of fiber-reinforced plastic resin, and specifically is formed with plural, plastic-resin-embedded, fiber-differentiated, circumferentially-adjacent circumferential (generally cylindrical and tubular-like) layers of fibers which are preferably glass fibers, and specifically, most preferably c-glass fibers, as mentioned above. In one dowel-bar and sleeve embodiment, referred to below as a first, or first-mentioned, dowel bar and sleeve embodiment, chooseable for employment in many, high-performance highway applications, there are three, circumferential layers of structurally differentiated fibers, and in the other dowel-bar and sleeve embodiment, referred to below as a second, or second-mentioned, dowel-bar and sleeve embodiment, selectable for use in many, other, high-performance highway applications, there are four such layers. Accordingly, in FIGS. 2 and 3, a total of four reinforcing-fibre layers are pictured, of which three should be considered as being present in sleeve 16 (i.e., within sleeve wall 16d) in the first-just-above-mentioned dowel-bar and sleeve embodiment, and all four in the second-just-above-mentioned dowel-bar and sleeve embodiment These four layers are shown at 20, 22, 24 and 26. Regarding the "first" dowel bar embodiment, what should be visualized by looking at FIGS. 3 and 4 is that only those three layers which appear at 20, 22 and 26 are present.

In both dowel bar embodiments described herein, the glass material present in sleeve 16 occupies about 60% by weight of the sleeve.

Layer 20, which appears as a wavy line in FIG. 4, includes glass-fibre mat material. Layer 22, which appears as a thickened, straight line in FIG. 4, includes glass-fibre roving material. Layer 24, which also appears as a wavy line in FIG. 4, includes glass-fibre mat material. And, layer 26, which appears as a thin, straight, dash-double-dot line in FIG. 4, includes glass-fibre veil material.

Discussing this illustrated, overall layer organization in what may be thought of as a "one-removed-layer" manner that relates specifically to the above-mentioned sleeve embodiment which features only three fibre-reinforcing layers, one sees in sleeve 16, i.e., in its wall 16d, by appropriately visualizing FIGS. 3 and 4 to imagine the presences of only three of the therein pictured, four layers, an arrangement of three, relevant, cooperative, fibre-reinforcing layers, which arrangement, progressing radially outwardly in the sleeve from its inside 16a, takes the form of a first-encountered, mat-material layer 20, a later-encountered, roving-material layer 22 disposed outwardly of layer 20, and an even later-encountered veil-material layer 26 disposed outwardly of roving-material layer 22. These three layers make up the previously mentioned wall 16d thickness in sleeve 16.

Alternatively, by looking at FIGS. 3 and 4 without "eliminating" from consideration one of the four, pictured layers, and instead by positively recognizing the presences of all four layers shown in these figures, one sees the other embodiment of sleeve 16, and hence of the dowel-bar structure being discussed herein, which features an alternative arrangement of four, relevant, cooperative, fibre-reinforcing layers, which alternative arrangement, progressing radially outwardly in the sleeve from its inside 16a, takes the form of "first-encountered", mat-material layer 20, "later-encountered", roving-material layer 22 disposed outwardly of layer 20, a second mat-material layer 24, and what was just referred to above as "even later-encountered" veil-material layer 26 shown disposed outwardly of layer 22. Here, too, in this arrangement of layers, the four, included layers make up the previously mentioned wall 16d thickness in sleeve 16.

The pre-pultruded sleeve end plugs, as mentioned earlier herein, include elongate roving fibers distributed across the entireties of the plugs' circular cross sections, embedded in the mentioned, thermoset, polyester resin present in the sleeve. These fibres extend substantially parallel to axes 10a, 12a and 16c.

Returning here for a moment to the very important topic mentioned above involving the fact that jacket 14, as distinguished from known, prior-art, core-component, over-coating structures, is not subjected to contact with any sharp-edged, high-stress, surface discontinuity regions within the dowel bar constructed as described herein, it is easy to see and understand, from the descriptions and illustrations which have now been presented of the sleeve and end-plug components which make up jacket 14, that no part of this jacket structure bears upon the sharp-edged surface discontinuity regions that exist adjacent the opposite ends of core 12, as can be seen at the two, such, regional locations in FIG. 4 marked 12c. This comes about, of course, because of the fact that sleeve 16, formed in accordance with the present invention, is a pultruded structure which has been pultrusion formed so that it extends, without any transitional shape change included in it, effectively as a continuum beyond the opposite ends of core 12 rather than folding over regions 12c, and that and plugs 18 possess circular cross-sections which match that of core 12. Moreover, it is very evident, from the above-stated, preferred dimensions of the sleeve and end plugs, and from the attendant fact that they are fibre reinforced, that these dowel-bar structural components are very robust, and unlikely ever to be cracked or penetrated under normal use conditions.

Turning attention now in succession to FIGS. 5 and 6, FIG. 5 illustrates, at 28, an apparatus for implementing the pultrusion-based methodology of the present invention—this apparatus possessing a pultrusion-formation axis 28a, and, in block/schematic fashion generally at 30 in FIG. 6, the preferred architecture of that methodology.

Progressing from left to right, i.e., from upstream to downstream ends of apparatus 28, across FIG. 5, apparatus 28 includes (1) a core-train pusher 32, simply represented by a darkened arrow whose arrowhead points in the direction of processing flow through apparatus 28, (2) a core-train formation, or forming, station 34, (3) a steel-core heater $H_1$ which is disposed within station 34 and designed to heat cores 12, as will be further explained, to a temperature of about 150° F. before actual, sleeve-formation pultrusion begins, (4) a reinforcing-fiber supply station 36 which, represented necessarily just in the plane of FIG. 5 (i.e., on one side only of pultrusion-formation axis 28a), is seen to include herein four, reinforcing-fiber-material distributing devices that are illustrated as rotary fibre-delivery spools 38, 40, 42, 44—devices that are representative of user-selectable, conventional structures designed to pay out, respectively, elongate, fibre-material runs, such as those appearing as straight, angularly inclined lines in FIG. 5, of glass-fiber mat material 20, glass-fiber roving material 22, glass-fiber mat material 24, and glass-fiber veil material 26, (5) a resin fibre-bathing, or resin bathing, station 45, and a fibre guide station 46 which, like fibre supply station 36, are respectively pictured necessarily just in the plane of FIG. 5 only on one side of axis 28a, (6) another heater, $H_2$, (7) a conventional, and appropriately sized (herein with a length of about 5- to 6-feet, and an internal, elongate, cylindrical pultrusion channel with a diameter of about 1½-inches) pultrusion die 48, the inside of which is heated to a temperature of about 280° F. by heater $H_2$, (8) a conventional, power-driven, pultrusion puller of any suitable design, such as a crawler-tread design, represented simply by a darkened arrow 50, operable herein to establish a pultrusion throughput speed of about 3- to 4.5-feet-per-minute, and (9) a suitable cross-cutter 52 which is employed to cross cut what is referred to herein as a pultrusion-result, intermediate, dowel-bar product, such as that designated 54 in FIG. 5, emerging from die 48. A fragmentary, end portion of a finished, cut-separated dowel-bar 10 is pictured to the right of cutter 52.

It should be understood that, while four, fibre-delivery spools (devices) have been illustrated in FIG. 5 in order to relate to a discussion regarding the delivery of fiber-reinforcing materials suitable to create four layers within a sleeve 16, in the context of fabricating a sleeve having only three layers within it, only three such delivery spools (devices) would be required, and, in terms of what is illustrated in FIG. 5, these three spools would include spools 38, 40 and 44.

Further discussing what has just been described respecting FIG. 5, the three, upstream processing stations, and the associated structures illustrated therein, which are involved with (1) supplying, i.e., paying out, from suitable delivery devices, such as the representatively pictured delivery spools, elongate runs of the several different kinds of reinforcing-fibre materials, (2) for bathing the these reinforcing-fibre-material runs en route to the pultrusion die with the appropriate plastic resin, and (3) for guiding the bathed fiber-material runs into the infeed, upstream end of the pultrusion die, must necessarily be constructed, and this may be done in entirely conventional, user chooseable manners, so as to be distributed relatively evenly around, i.e. circumferentially around, pultrusion-forming axis 28a so that a sleeve 16 ultimately becomes pultrusion-formed uniformly circumferentially around a core 12. Just how this circumferential distribution of paying out, bathing and guiding equipment is organized, and what particular type of such equipment is employed, is entirely a matter of user/designer choice, and forms no part of the present invention.

Located preferably adjacent both (1) the upstream, or infeed, and (2) the downstream, or discharge, ends of apparatus 28, are suitable track-like, such as trough-like, and preferably, though not necessarily, stationary, support structures, not illustrated herein, that provide appropriate, underlying support (a), adjacent the upstream end of the apparatus for what will shortly be described as a stream of elements that make up a pre-pultrusion core-train of dowel-bar central elements (i.e., endo-abutting, longitudinally alternating cores and end-plug blanks) that are to be fed into die 48 for pultrusion forming of sleeve structure 16, (b), adjacent the downstream end of the apparatus, and of die 48, for the emerging intermediate, pultrusion-result, dowel-bar product, such as that shown at 54, and (c), beyond cross-cutter 52, for the finished and thereafter separated dowel bars 10. Other modes, etc., of underlying "component-throughput-transport" support may, of course, be implemented.

While the process of sleeve formation herein is clearly a pultrusion-based process, at the extreme upstream end of apparatus, there are engaged herein, as will now be described, upstream, core-train-forming and core-train-pushing, operational stages that relate to the needed formation, and then the downstream-transport-moving, of what has been described, referred to above, as a core train of components that become organized into a horizontal, linear train in any suitable, component-placement manner in station 34 for feeding from that station toward stations 45, 46, and pultrusion die 48. As mentioned earlier herein, what is referred to as a core train, such as the one pictured fragmentarily, and horizontally, at 56 in FIG. 5, is made up of a continuous train of endo-abutting, longitudinally alternating, elongate, cylindrical, high-shear-strength, steel cores 12, and shorter, elongate, cylindrical and matching-cross-section, plastic-resin and fiber-reinforced, pre-pultruded sleeve end-plug blanks, such as the two end-plug blanks shown at 58 in this figure—one of these blanks being disposed just upstream from die 48, and the other being disposed within the die. As will become apparent shortly, each end-plug blank has a length which is about twice that of a finished end plug, and namely about 2-inches.

Considering now the overall dowel-bar formation pultrusion process proposed by the present invention, a core train, including endo-abutting, longitudinally alternating cores and end-plug blanks, is suitably formed along a line in forming station 34. Within this station, as the formed core train is moved by pusher 32 toward the pultrusion die, and by appropriately timed and staged operation of previously described heater $H_1$, which may take any suitable form of a heater selected by the user, and which may conveniently and conventionally be operated under the control of a suitably programmed, digital computer (not part of the present invention), the steel cores in the train are preferably heated, as mentioned earner herein, to a temperature of about 150° F. Such heating is preferably done in order to prevent the cores, during processing within pultrusion die 48, from acting as undesired heat sinks which could retard, and perhaps interfere with, appropriate curing of the resin which coats the fiber reinforcing materials within the die.

The formed core train, with its included, appropriately pre-pultrusion-activity, heated, steel cores, is moved from the forming station toward and into the die by pusher 32, which is operated in any appropriate fashion, entirely selectable by the user, to shift the core-train components at an appropriate rate toward and into the pultrusion die, and in a manner so as to accommodate, as far as the pultrusion die is "concerned", a substantially steady and effectively continuous stream of freshly die-introduced core-train components.

There are many conventional ways that a pusher, such as schematically illustrated pusher 32, may be constructed and operated so as (1) to permit easy, essentially continuous assembly in station 34 of a progressively formed core-train line of components, and (2), at appropriate moments to push these train-formed components in proper, endo-abutting conditions so that the pultrusion die will experience a continuity inflow of dowel-bar, core-component material. Those skilled in the art will recognize that once the substantially "endless" core train, pushed to an appropriate location along pultrusion-formation axis 28a, is sufficiently disposed within the pultrusion die, and specifically sufficiently contained therewithin so that resin-coated, fibre reinforcing, sleeve material has begun to stick to the core train, the downstream operation of puller 50 "takes over" in conventional pultrusion fashion, and functions, in a continuity manner to drive the downstream-directed, flowing motion of all within the die.

It should be noted here that proper endo abutment between the cores and end-plug blanks in a core train, during the core-train forming process, and the associated moving of a formed core train into die 48, depends upon the opposite ends of the cores and end-plug blanks lying correctly in parallel planes that are disposed normal to the respective long axes of these components.

While these core-train forming and pushing activities are underway in apparatus 28 in station 34 and by pusher 32, elongate runs, such as those, previously mentioned, shown at 20, 22, 24, 26 in FIG. 5, of the appropriate number of reinforcing-fibre materials, i.e., three or four such materials, depending upon which of the two embodiments of the dowel bar is to be fabricated, are (1) paid out from the spools in fiber supply station 36, (2) lead through resin bathing station 45 wherein they are bathed in, and wetted with, the selected plastic resin, and thereafter (3) guided through, and by, guide station 46 toward and into the intake end of pultrusion die 48, appropriately disposed, circumferentially about apparatus axis 28a, and, of course, in the appropriate radially organized layer arrangement, which has been mentioned earlier herein, distributed circumferentially around the now centrally (on axis 28a) located core train so as to be arranged, within the pultrusion die, for the correct formation of a sleeve 16.

If the first-discussed dowel-bar embodiment is to be made, fibre-material paying out takes place from spools 20, 22, 26, whereas if the second-discussed embodiment is to be formed, such paying out occurs from all four, illustrated spools.

Within pultrusion die 48, as the through-moving core train, and the associated, surrounding, wetted-fiber-reinforced, materials pass through the die, an appropriate level of heat, generated inside the die (at the previously mentioned, representative, internal temperature of about 280° F.) by heater $H_2$, coupled with the attendant, moving-surface-contact which occurs with the internal, cylindrical pultrusion channel within the die, cause the resin-coated mass of material to form appropriately around the core train in the configuration of what is to become a sleeve 16. The plastic resin material cures effectively to doneness by the time that all of these materials emerge from the downstream end of the die. Curing of the plastic resin material within die 48 is, of course, promoted by heat which is generated by heater $H_2$, and to some extent by heat radiated from the pre-heated steel cores which, because of their pre-heated conditions, do not negatively act as unwanted heat sinks within the die.

It will be well understood by those skilled in the art that (1) the rate of throughput of materials established selectively in apparatus 28 in the formation of dowel bars, (2) the selected level of internal-die heating which is created by heater $H_2$, and (3) the overall length of die 48, per se, are appropriately determined by the specifically chosen sizes of the materials that are to be employed in the making of a particular size and character of a dowel bar 10, and in relation to the formation curing characteristics of the chosen plastic resin material.

As has been mentioned herein, what emerges continuously during dowel-bar-making, from the downstream, discharge end of die 48, is what has been referred to hereinabove as an intermediate, pultrusion-result, dowel-bar product, as seen at 54 in FIG. 5.

Downstream from die 48, and under appropriate operational and timing control, such as might be implemented by a suitably programmed digital computer, cross-cutter 52 is operated to produce a cross cut in this emerging "intermediate" product, with each such cut being made at a location which is substantially exactly midway between the opposite ends of each core-plug blank. Such a cross cut is shown generally at 59 in FIG. 5.

The result of this operation is, of course, separation, one after another, of completed dowel bars 10 made in accordance with the invention.

Outlining now compactly, in relation to the block/schematic diagram presented in FIG. 6, and in one manner of expressing the methodology of the present invention, what is proposed and offered is a plural-component, composite-material, highway dowel-bar making method 30 including (a) preparing an elongate core train having a long axis, and possessing, along that axis, endo-abutting, longitudinally alternating, (1) elongate, high-shear-strength, cylindrical cores having a common, certain cross section, and (2) elongate, but shorter, cylindrical, fibre-reinforced plastic-resin end-plug blanks having opposite ends, and each having a cross section matching the certain cross section of the cores—Block 60, (b) using the core train as a longitudinally moving mandrel, pultrusion-forming a fibre-reinforced plastic-resin sleeve continuously and bondedly around the core train so as to produce a pultrusion-result, intermediate, dowel-bar product—Block 64, and following pultrusion-forming, cross-cutting the intermediate, dowel-bar product at each longitudinal location therein which is intermediate the opposite ends of the end-plug blanks, and thereby forming completed dowel bars—Block 66.

From an augmented point of view, this methodology further contemplates that pultrusion-forming is preceded by (a) paying out, from suitable supplies, continuous, elongate runs of reinforcing fibre materials, (b) bathing these materials runs in curable, liquid plastic resin, and guiding the bathed runs into circumferential layer structure for pultrusion in a tubular region circumsurroundingly disposed relative to the outside of the prepared core train—Block 62.

Other features of this methodology are discussed above, and include employing, as reinforcing fibre materials, (1) glass-fibre roving possessing plural, elongate, linear fibres, (2) continuous-glass-fibre mat, and (3), glass-fibre veil, and the paying out and guiding steps collaboratively perform arranging of the different reinforcing fibre materials whereby, relative to the outside surface of the core train during the pultrusion-sleeve-forming step, mat material becomes disposed as part of an innermost pultrusion layer, veil material becomes disposed as part of an outermost pultrusion layer, and roving material becomes part of a layer which is intermediate these innermost and outermost layers, with its included, elongate fibers disposed with their long axes substantially paralleling the core train's long axis.

Accordingly, the present invention features a special pultrusion-based fabrication methodology, in certain variations for creating a pair of modifications of important, new, advanced-performance and significantly-enhanced-longevity highway dowel bars. Variations and modifications are, of course, possible which will come within the spirit of the invention, and which may well come to the minds of those generally skilled in the relevant art.

We claim:

1. A plural-component, composite-material, highway dowel-bar making method comprising
   preparing an elongate core train having a long axis, and possessing, along that axis, endo-abutting, longitudinally alternating, (a) elongate, cylindrical cores, each core having a common, constant cross section at every location along the long axis, and (b) elongate, but shorter, cylindrical, fibre-reinforced plastic-resin end-plug blanks having opposite ends, and each end-plug blank having a constant cross section at every location along the long axis matching the constant cross section of the cores,
   using the core train as a longitudinally moving mandrel, pultrusion-forming a fibre-reinforced plastic-resin sleeve continuously and bondedly around the core train so as to produce a pultrusion-result, intermediate, dowel-bar product, and
   following said pultrusion-forming, cross-cutting the intermediate, dowel-bar product at longitudinal locations therein which are intermediate the opposite ends of end-plug blanks, and thereby forming completed dowel bars.

2. The method of claim 1, wherein said pultrusion-forming is preceded by (a) paying out, from suitable supplies, continuous, elongate runs of reinforcing fibre materials, (b) bathing these materials runs in curable, liquid plastic resin, and guiding the bathed runs into circumferential layer structure for pultrusion in a tubular region circumsurroundingly disposed relative to the outside of the prepared core train.

3. The method of claim 2, wherein the reinforcing fibre materials include (1) glass-fibre roving possessing plural, elongate, linear fibres, (2) continuous-glass-fibre mat, and (3), glass-fibre veil, and said paying out and guiding steps collaboratively perform arranging of the different reinforcing fibre materials whereby, relative to the outside surface of the core train during the subsequent pultrusion-sleeve-forming step, mat material becomes disposed as part of an innermost pultrusion layer, veil material becomes disposed as part of an outermost pultrusion layer, and roving material becomes part of a layer which is intermediate these innermost and outermost layers, with its included, elongate fibers disposed with their long axes substantially paralleling the core train's long axis.

4. The method of claim 1 which further comprises heating the cores prior to said pultrusion-forming.

5. The method of claim 1 which further comprises performing pultrusion-forming in a heated environment.

6. A method of manufacturing a composite-material highway dowel-bar, the method comprising:
   providing a train of cylindrical steel cores along a long axis, with each adjacent pair of steel cores separated by a single cylindrical blank;
   forming a fiber-reinforced plastic-resin sleeve around the train by passing the train through a pultrusion die, thereby forming an intermediate dowel-bar product; and
   cutting through the intermediate dowel-bar product to form completed dowel-bars;
   wherein cutting through the intermediate dowel-bar product includes cutting through each blank so that a first portion of each blank is included in a first completed dowel-bar and a second portion of each blank is included in a second completed dowel-bar.

7. The method of claim 6, wherein each of the cylindrical steel cores has constant cross-section along the long axis and each cylindrical blank has a constant cross-section along the long axis matching the constant cross-section of the steel cores.

8. The method of claim 6, wherein the fiber-reinforced plastic-resin sleeve includes (a) an outermost layer including veil material, (b) an innermost layer including mat material, and (c) an intermediate layer between the innermost and outermost layers including elongate fibers disposed with their long axes substantially parallel to the long axis of the train.

* * * * *